Nov. 17, 1936.  E. A. MASSA, JR  2,061,322
MECHANISM
Filed Nov. 20, 1934
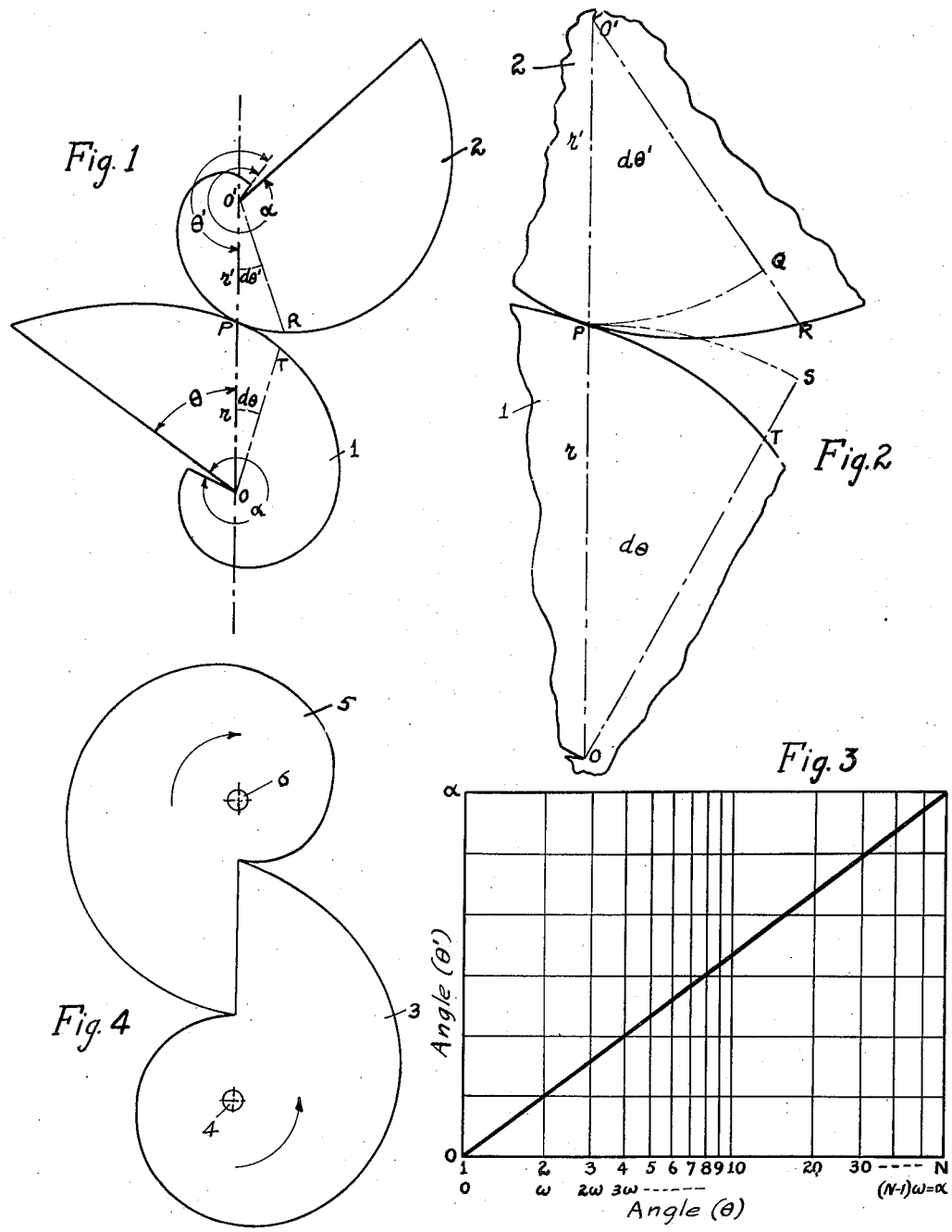

Nov. 17, 1936.   E. A. MASSA, JR   2,061,322
MECHANISM
Filed Nov. 20, 1934   4 Sheets-Sheet 2
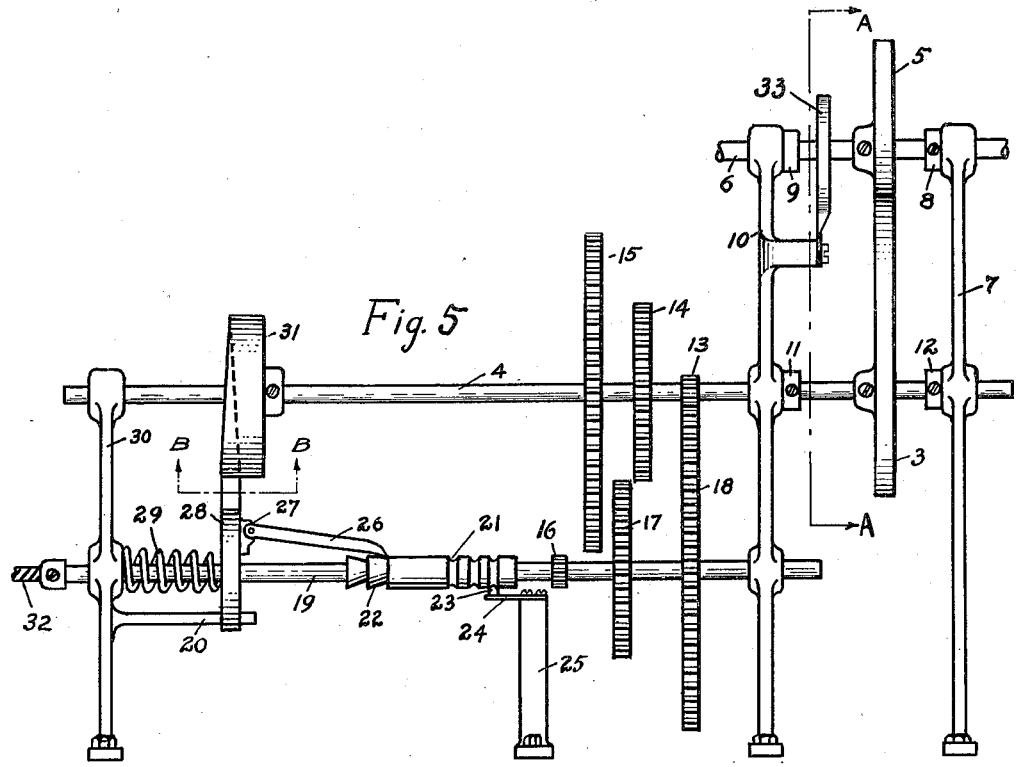
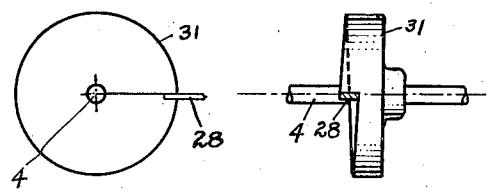
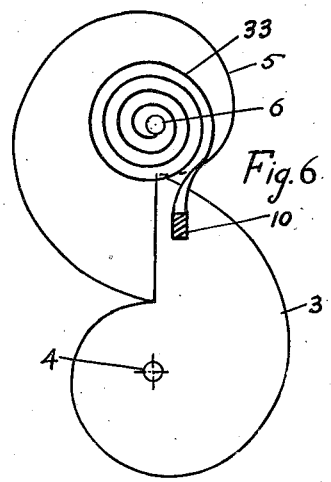
INVENTOR:
Ernest A. Massa Jr Nov. 17, 1936.  E. A. MASSA, JR  2,061,322
MECHANISM
Filed Nov. 20, 1934  4 Sheets-Sheet 3

INVENTOR:
Ernest A. Massa Jr.

INVENTOR:
Ernest A. Massa Jr.

Patented Nov. 17, 1936

2,061,322

UNITED STATES PATENT OFFICE 2,061,322

MECHANISM

Ernest A. Massa, Jr., Haddon Heights, N. J., assignor of fifty-five per cent to Frank Massa, West Collingswood, N. J.

Application November 20, 1934, Serial No. 753,813

9 Claims. (Cl. 74—95)

My invention is concerned with mechanisms for the transmission of motion and more particularly with mechanisms in which the ratios between the velocities of the driver and follower are continuously changing. Mechanisms having a continuously variable speed ratio have long been known, such as, for example, two equal ellipses, each turning about one of its foci and placed in contact so that the distance between the turning axes is equal to the major axis of the ellipse. In this and other similar forms of variable ratio mechanisms the designer's choice is limited only to the minimum and maximum speed ratios during a cycle and he has practically no control over the rate of change of the speed ratio during the cycle. In my invention I propose to design the shapes of the driver and follower so that for uniform angular velocity of the driver the angular velocity of the follower varies logarithmically throughout the operating cycle.

Figure 9:
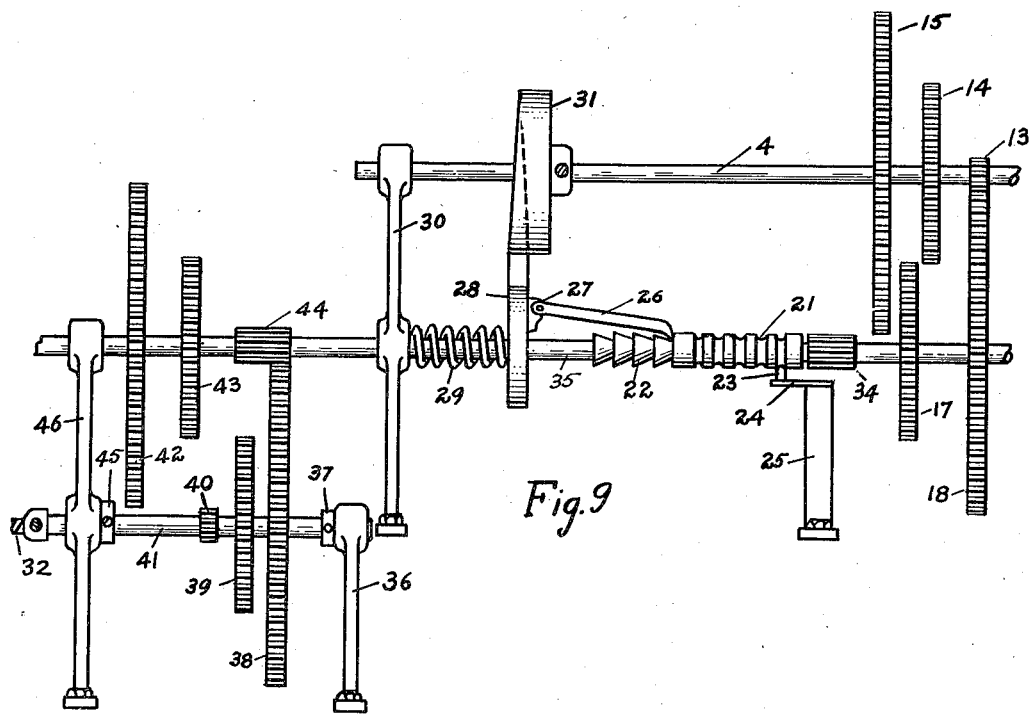
Figure 11:
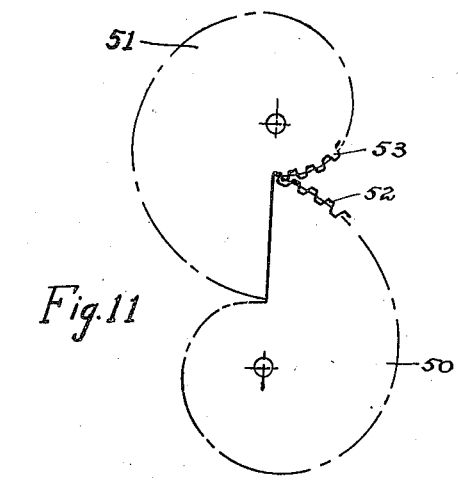
Figure 10:
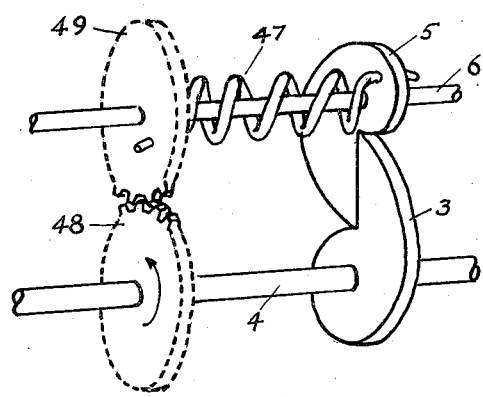
Figure 12:
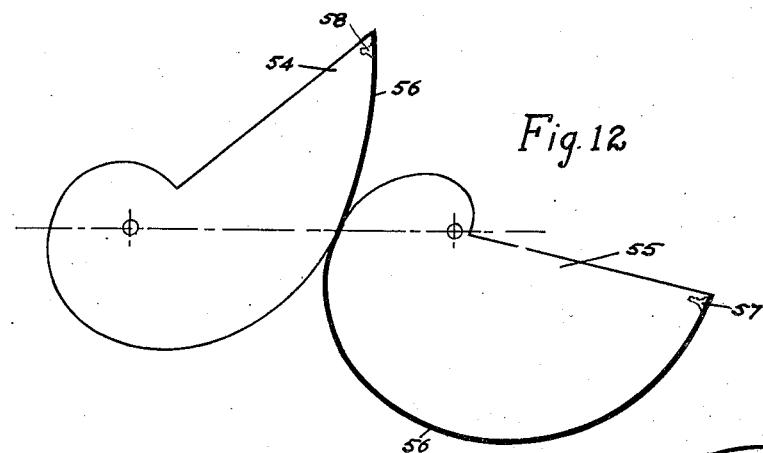
Figure 13:
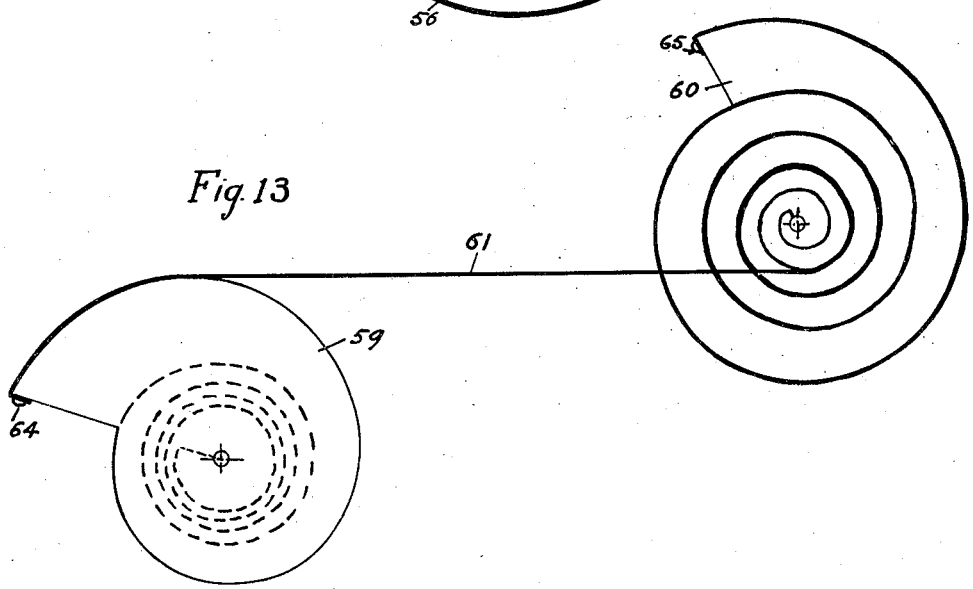
Figure 14:
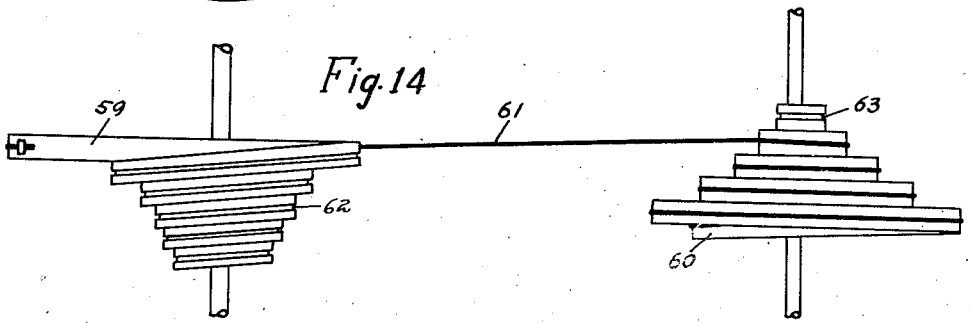

I shall describe my invention in conjunction with the following figures:

Fig. 1 is a diagrammatic sketch which serves to illustrate the symbols used in my mathematical analysis. Fig. 2 is an enlarged view of a portion of Fig. 1. Fig. 3 is a graphical representation of the relation between the angular motion of the driver and follower. Fig. 4 is a view showing the shape of the driver and follower plates in one form of my invention. Fig. 5 shows an arrangement for getting as many as three continuous logarithmic cycles from a single cycle set of plates. Fig. 6 is a view taken on the line A—A of Fig. 5. Fig. 7 is a view taken on the line B—B of Fig. 5. Fig. 8 is an end view of Fig. 7. Fig. 9 shows an arrangement for getting more than three continuous logarithmic cycles from a single cycle set of plates. Fig. 10 shows a method for making the follower always keep constant contact with the driver. Fig. 11 shows another method for making the follower keep constant contact with the driver. Fig. 12 shows still another driving arrangement. Fig. 13 shows a set of plates whose driving range extends over several revolutions. Fig. 14 is a side view of Fig. 13.

Before describing constructional details of my invention, I shall give a mathematical analysis of the problem in order that those skilled in the art may have a more complete understanding of its solution.

Referring to Fig. 1, a plate 1 is mounted so that it may turn about a fixed axis O. A second plate 2 is similarly mounted on another fixed axis O'. Each plate turns through the same total angle $\alpha$ and the shape of each plate will be determined so that as plate 1 is rotated in a counter-clockwise direction, plate 2 will follow in a clockwise direction keeping contact with plate 1 on the line of centers O—O' and for equal angles of turning of plate 1, plate 2 will turn through angles which get successively smaller according to an exponential law.

The desired relation between the angle through which the driver 1 turns ($\theta$) and the angle through which the follower 2 turns ($\theta'$) is shown graphically in Fig. 3. In the general case, for constant angular speed of the plate 1 in Fig. 1, the angular speed of plate 2 will vary logarithmically over a range formed N to 1. The abscissa in Fig. 3 is divided into N—1 divisions (range N to 1) which are plotted on a log scale as shown. Each division represents an equal angle $\omega$ through which plate 1 turns, where $$\omega = \frac{\alpha}{N-1}$$

The angle $\theta'$ through which plate 2 must turn is read on the linear ordinate scale in Fig. 3 for any value of $\theta$ along the logarithmic abscissa scale.

Since the slope of the curve in Fig. 3 is constant, the ratios of ordinate to abscissa at any two points are equal thus giving the following mathematical equation for the graph.

$$\frac{\theta'}{Ln\left(\frac{\theta}{\omega}+1\right)} = \frac{\alpha}{LnN} \qquad (1)$$

which can be written $$\theta' = KLn\left(\frac{\theta}{\omega}+1\right) \qquad (2)$$

where $$K = \frac{\alpha}{LnN}$$

By differentiating Eq. (2), I get $$d\theta' = K\frac{d\theta}{\theta+\omega} \qquad (3)$$

Now, referring to Fig. 2 which is an enlarged view of the portion of the plates of Fig. 1 which are in contact, since O and O' are fixed, it is obvious that the sum $r+r'$ must be fixed. I shall denote this sum as $$r+r' = C \qquad (4)$$

Also, as plate 1 turns counter-clockwise through an angle $d\theta$, plate 2 will turn clockwise through an angle $d\theta^1$, which must be such as to make the length of curve PR equal to that of PT. In addition, the decrease in the value of $r$ which is ST, must equal the increase in $r'$ which is QR since, as mentioned above, $r+r'=C$ at all points of contact of the revolving plates.

For infinitesimal angles $d\theta$ and $d\theta'$ the following relations will hold $$(rd\theta)^2 + (ST)^2 = (PT)^2 \quad (5)$$

$$(r'd\theta')^2 + (QR)^2 = (PR)^2 \quad (6)$$

Since $PT = PR$ and $ST = QR$, it follows that $$rd\theta = r'd\theta' \quad (7)$$

Substituting Eqs. (3) and (4) in (7), I get the relation $$rd\theta = (C-r)K\frac{d\theta}{\theta + \omega} \quad (8)$$

which upon solving for $r$ as a function of $\theta$ gives $$r = \frac{KC}{\theta + \omega + K} \quad (9)$$

where $r$ = radius of driver plate at angle $\theta$,
$\theta$ = angle in radians through which the driver plate has turned,
$C$ = distance between axes of plates, $$K = \frac{\alpha}{LnN},$$

$\alpha$ = total useful angular range of either plate in radians,
$N$ = ratio of maximum to minimum angular velocity of the follower plate while the driver moves at constant angular velocity over the entire angle $\alpha$, $$\omega = \frac{\alpha}{N-1}.$$

By fixing $\alpha$, $N$, and $C$ for any particular case, I can obtain the shape of the driver plate by solving for specific values of $r$ and $\theta$ in Eq. (9). The shape of the follower plate is then obtained by substituting these values of $r$ and $\theta$ in Eqs. (4) and (2) which result in specific values of $r'$ and $\theta'$, the radius and angle of the follower plate which will run with the driver plate having the shape determined by the values of $r$ and $\theta$ mentioned above.

I shall now make a sample calculation to illustrate the use of the formulas which I have computed above. For this calculation I wish to design a pair of plates such that the driver being turned at constant angular speed, the follower will vary in speed over one complete logarithmic cycle (speed ratio = 10:1) for a complete revolution of each plate. I shall now transfer this physical statement to the mathematical symbols described above.

For this problem
$\alpha = 360° = 2\pi$ radians,
$N = 10$, $$K = \frac{\alpha}{LnN} = \frac{2\pi}{2.303} = 2.73,$$

$$\omega = \frac{\alpha}{N-1} = \frac{2\pi}{9} = .698 \text{ radians},$$

$C = 2000$ assumed arbitrary units).

Using these constants, I shall first determine the shape of the driver plate by solving Eq. (9) for $r$ at various values of $\theta$ covering the complete angular range of $2\pi$ radians. For the various values of $r$ and $\theta$, I shall then find the corresponding values of $r'$ and $\theta'$ by substituting in Eqs. (4) and (2), which will give me the shape of the follower plate.

In the following table, I have listed some of the numerical results that I obtained in the solution of the above problem.

| Angle measured on driver plate | | Radius of driver plate from Eq. (9) | Radius of follower from Eq. (4) | Angle on follower from Eq. (2) | |
|---|---|---|---|---|---|
| $\theta$ | | $r$ | $r'$ | $\theta'$ | |
| Degrees | Radians | | | Radians | Degrees |
| 0 | 0 | 1595 | 405 | 0 | 0 |
| 4 | .0698 | 1561 | 439 | .260 | 14.9 |
| 8 | .1395 | 1532 | 468 | .498 | 28.6 |
| 16 | .2792 | 1474 | 526 | .920 | 52.6 |
| 30 | .523 | 1382 | 618 | 1.528 | 87.5 |
| 45 | .785 | 1297 | 703 | 2.055 | 117.8 |
| 60 | 1.047 | 1220 | 780 | 2.500 | 143.2 |
| 75 | 1.310 | 1155 | 845 | 2.885 | 165.3 |
| 90 | 1.570 | 1095 | 905 | 3.22 | 184.5 |
| 120 | 2.095 | 989 | 1011 | 3.78 | 216.5 |
| 150 | 2.62 | 905 | 1095 | 4.25 | 243.5 |
| 180 | 3.14 | 832 | 1168 | 4.65 | 267 |
| 210 | 3.67 | 770 | 1230 | 5.01 | 287 |
| 240 | 4.19 | 718 | 1282 | 5.31 | 304 |
| 270 | 4.71 | 671 | 1329 | 5.60 | 321 |
| 300 | 5.23 | 631 | 1369 | 5.85 | 335 |
| 330 | 5.76 | 595 | 1405 | 6.08 | 348 |
| 360 | 6.28 | 565 | 1435 | 6.28 | 360 |

Fig. 4 shows the shapes of the plates which meet the specifications in the above table. The driver 3 is fixed to a shaft 4 and the follower 5 is fixed to another shaft 6. In the arrangement shown, the driver is made to turn in a counter-clockwise direction and the follower turns in a clockwise direction. The distance between the shafts 4 and 6 is fixed and is equal to the value chosen for C in the above problem. The shape of the driver 3 was obtained by plotting values of $r$ in the above table at the corresponding angles $\theta$; $\theta$ being measured in a clockwise direction. The shape of the follower 5 was obtained by plotting the values of $r'$ tabulated above at the corresponding angles $\theta'$; $\theta'$ being measured in a counter-clockwise direction.

The mechanism shown in Fig. 4, therefore, is such that for one complete revolution of the plate 3 at constant angular speed in a counter-clockwise direction, the plate 5 will turn in a clockwise direction (assuming that means is provided for keeping 5 always in contact with 3, such as shall be later described) at an angular speed which decreases logarithmically, going through one complete cycle of ten to one for 360° of rotation of either plate. This means that for linear motions of the driver shaft 4, the follower shaft 6 will move logarithmically. Since the particular plates designed in Fig. 4 are such that exactly one logarithmic cycle is passed through for each revolution, it is possible to decrease the ratio of the driving speed by a factor of ten at the end of each revolution and thus permit shaft 6 to turn continuously through as many logarithmic cycles as there are speed reductions provided for on shaft 4.

One method for obtaining a continuous three cycle range from a set of single cycle plates is shown in Fig. 5. The driving plate 3 is fixed to shaft 4 which is prevented from moving axially by means of the collars 11 and 12. The follower plate 5 is fixed to the shaft 6 which is also prevented from moving axially by means of the collars 8 and 9. The castings 7 and 10 contain the bearings for shaft 6 and the castings 7, 10 and 30 contain the bearings for shaft 4. On shaft 4 are also fixed three gears 13, 14 and 15 as well as a cam 31, which is more clearly shown in Fig. 7, which is a section taken on the line B—B of Fig. 5, and Fig. 8 which is a side view of Fig. 7.

Returning to Fig. 5, a shaft 19 is mounted so that it is free to turn and slide in a set of bearings provided in the castings 10 and 30. Fixed to shaft 19 are the gears 16, 17 and 18. The ratio of the pitch diameter of gear 18 to gear 13 is 10:1, the ratio of 17 to 14 is 1:1, and the ratio of 16 to 15 is 1:10. Loosely fitted to shaft 19 is a plate 28 whose axial position is controlled by the cam 31. A spring 29 serves to keep the edge of 28 always in contact with the face of the cam 31. Rotation of the plate 28 is prevented by the fixed guide 20 that passes through a clearance hole in 28. The plate 28 carries a pivot 27 for the arm 26. This arm rides over an enlarged portion of the shaft 19 into which are cut the grooves 22. Another series of grooves 21 are also cut in the shaft as shown. A flat spring 24 is mounted on a fixed support 25 and carries a projection 23 which fits into the grooves 21 and causes the axial position of 19 to be determined by one of the grooves 21.

The operation of the mechanism in Fig. 5 is as follows: The flexible shaft 32 is connected to the source of mechanical energy. At the beginning of the operating cycle the component parts are arranged as shown. The driver and follower plates are set to the beginning of their cycle as shown in Fig. 6 (which is a view taken on the line A—A of Fig. 5), and the cam 31 is fixed so that the plate 28 is in contact with the innermost axial point of the cam face; that is, the spring 29 is expanded to its maximum position. Gear 18 is meshed with 13 causing shaft 4 to run at $\frac{1}{10}$ the speed of shaft 19. As shaft 32 turns in the proper direction, the cycle of operation for the mechanism begins. Shaft 4 turns in a counter-clockwise direction as viewed in Fig. 6, causing shaft 6 to turn clockwise provided the plate 5 is kept in continuous contact with 3. I have shown one method for accomplishing this in Figs. 5 and 6. One end of a spiral spring 33 is fixed to the shaft 6 and the other end is anchored to the casting 10. The spring is wound in a manner that will cause sufficient torque to be exerted on the shaft 6 to overcome the load imposed on the shaft plus any gravitational unbalance that may be caused by the unsymmetrical plate 5 turning around on its axis.

As the drive shaft 32 turns at constant speed, shaft 6 turns at a speed which decreases exponentially. At the same time the cam 31 forces the plate 28 to move to the left, compressing the spring 29. An instant before shaft 4 has made one complete revolution, the plate 28 has moved axially to the outermost edge of the cam 31, the arm 26 has moved over into the next notch 22, the spring 29 is compressed to its minimum length and the plates 3 and 5 are approaching their original starting position shown in Fig. 6. An instant later the plate 28 passes the outer edge of the cam face and the spring 29 causes the plate 28 and the arm 26 to force the shaft 19 to the right. The spring 24 deflects due to the force and causes the projection 23 to engage in the second groove 21. At this point, gear 18 is disengaged from 13 and 17 is meshed with 14, causing a speed reduction of shaft 4 to $\frac{1}{10}$ of the original value. At the same time, gear 16 is brought to a position near 15 so that at the beginning of the next cycle, 17 will be disengaged from 14 and 16 will drive 15, causing another $\frac{1}{10}$ speed reduction, thus resulting in shaft 6 turning through three complete logarithmically decreasing speed cycles for a constant speed of the driver 32.

For the mechanism just described, the shaft 19 must be slid back to its original position after the three cycles are passed through, and the spring 33 must be wound up three turns to preserve the original tension and make the mechanism operative over the next three cycles.

I shall describe other means for making the follower 5 keep constant contact with the driver 3 later on in my specification. Some of my other methods will not require any spring resetting adjustment such as mentioned above.

In applications where more than three cycles are required, a multiple gear reduction system can be used such as shown in Fig. 9. The arrangement in Fig. 9 is similar to that of Fig. 5 insofar as several components are concerned whose functions have already been described. Shaft 19 in Fig. 5 has been replaced by a longer shaft 35 in Fig. 9 and gear 34 replaces the original gear 16 in Fig. 5. The source of mechanical power is applied to shaft 41 in Fig. 9 on which are fixed the gears 38, 39 and 40. Axial motion of 41 is prevented by means of the collars 37 and 45. A second set of gears 42, 43 and 44 are mounted on shaft 35 as shown. The mechanism for sliding the shaft 35 over a notch at the completion of each cycle has already been described in connection with Fig. 5.

Gears 34 and 44 are both of sufficient length to remain engaged to their mates for three successive revolutions of shaft 4. Fig. 9 shows the arrangement of the components at the beginning of the first cycle. Shaft 35 turns at ten times the angular speed of shaft 41 and shaft 4 turns at ten times the speed of shaft 35. At the beginning of the second cycle 38 still drives 44 and 17 drives 14 which causes a speed reduction of $\frac{1}{10}$ between 4 and 41. At the beginning of the third cycle 38 still drives 44 and 34 drives 15 which causes another $\frac{1}{10}$ speed reduction between 4 and 41. At the beginning of the next cycle 34 still remains engaged to 15 and 44 leaves 38 bringing 43 in contact with 39, causing another $\frac{1}{10}$ speed reduction between 4 and 41 by virtue of the $\frac{1}{10}$ speed reduction secured in shifting from 38 on 44 to 39 on 43. For the last cycle, gear 34 still drives 15, 43 leaves 39, and 40 drives 42 causing the next $\frac{1}{10}$ reduction in speed.

It is obvious that this step reduction principle can be extended to cover as many cycles as desired by simply transferring the drive shaft 32 to another shaft which must be geared to shaft 41 the same as 41 is now geared to 35. The gears 34 and 40 will have to be made longer so that they will remain in contact for the additional cyclic range obtained by the change.

In Fig. 10 I have shown an arrangement whereby the follower 5 may be made to keep constant contact with the driver 3 for any number of complete revolutions of the driver. A gear 48 is fastened to shaft 4 and drives a gear 49 which has the same number of teeth. Gear 49 is loose on shaft 6. A spring is anchored to 49, wound up to the desired tension and the other end is anchored to 5. The torsional moment of the twisted spring is sufficient to overcome all forces which are acting to oppose the motion of shaft 6. Under this condition, as shaft 4 turns in the direction of the arrow, the torsional moment of the spring 47 will cause the plate 5 to keep contact with 3 at all times. For each revolution of 5 the spring 47 will unwind one turn but during the same period the gear 49 will cause it to wind up one turn thus keeping the average force constant in the spring for any number of revolutions.

In Fig. 11 I show another arrangement for keeping a set of plates in constant contact. The pitch lines of the plates are shown by 50 and 51 in which 50 is the driver and 51 the follower. A number of preferably small teeth 52 are uniformly placed around the pitch line 50 and the same number of teeth 53 are placed around 51. The linear spacing between the teeth 53 and 52 are equal. By this arrangement the plates effectively become gears.

The limitation to this method of driving is dependent on the steepness of the curves at the driving points and this method may not always be practical in such cases where a set of plates are designed such that the follower turns through several logarithmic cycles for each revolution of the driver.

The teeth 52 and 53 may be cut in the material from which the plates are made, or in some cases it may be preferable to have the outer edge of the plates made of resilient material, such as rubber, in which the teeth are placed. By having resilient teeth they do not have to be as fine or as closely spaced because each tooth can bend slightly whenever it comes into a binding relation with its mate on the other plate.

Another method for causing the follower to be always in contact with the driver is shown in Fig. 12. In this arrangement, a thin flat ribbon 56 is anchored to the driver plate 54 by means of a screw 58. The length of 56 is equal to the length of the contact surface of either plate and the other end of the ribbon is anchored to the end of the follower plate 55, as shown, by means of the screw 57.

The shapes of the plates shown in Fig. 12 are such that for one revolution of the driver, the follower turns through two complete logarithmic cycles (a speed ratio varying from 100 to 1).

The ribbon drive described in Fig. 12 permits only one revolution of the plates, at the end of which the plates must be turned back to the starting point. Such a drive is well adapted to cases in which the driver does not rotate continuously in one direction, but rather to a drive in which the driver oscillates in position between 0 and 360 degrees and the follower is to follow these variations in position and itself move in a logarithmic relation to the positions of the driver.

In Fig. 13 and Fig. 14 I have shown two views of a set of plates designed so that the angular range of each one is 1800 degrees. The driver 59 has a groove 62 along its periphery and the follower 60 has a groove 63 around its periphery as shown in Fig. 14. A steel wire 61 is fastened to the driver 59 at 64, placed in the groove 62, and run over to the follower 60. The wire is then placed in the groove 63, wrapped around the plate 60, and anchored at 65.

This method of driving just described causes a small error to be introduced in the position of the follower due to the drive wire not remaining parallel throughout the cycle. This error is a function of the separation of the two plates, decreasing with increase in spacing. By proper placement of the two plates, the error may be made negligible. It is also possible to modify the shape of the plates if it is desired to compensate for this error for a particular arrangement of the components.

I claim as my invention:

1. In combination, a driving element, a driven element, the driving element being associated mechanically with the driven element to drive the same, the useful driving surface of the driving element being configured to conform to the law expressed by the following formula:

$$r = \frac{KC}{\theta + \omega + K}$$

and the driven element being configured to conform to the following formula:

$$r + r' = C$$

2. In combination, a driving shaft, a driven shaft, a driving element attached to the driving shaft, a driven element attached to the driven shaft, the surface of each element shaped to conform to formulas expressed in claim 1, the constants in said formulas so chosen that for one complete revolution of the driving shaft the driven shaft makes one complete revolution.

3. In combination, a driving shaft, a driven shaft, a driving element attached to the driving shaft, a driven element attached to the driven shaft, the surface of each element shaped to conform to the formulas expressed in claim 1, the constants in said formulas so chosen that for one complete revolution of the driving shaft the driven shaft makes one complete revolution, the speed ratio between the initial and final position of the shafts being 10 to 1.

4. The combination set forth in claim 1 and means associated therewith for keeping the surface of the driven element in continuous contact with the surface of the driving element, said means consisting of a spiral spring, one end of which is anchored to the driven element and the other end being anchored to a fixed point.

5. The combination set forth in claim 1 and means associated therewith for keeping the surface of the driven element in continuous contact with the driving element, said means consisting of a spiral spring, one end of which is anchored to the driven element and the other end is continuously moved in relation to the motion of the driven element such that the average tension in the spring remains constant throughout the cycle of operation.

6. The combination set forth in claim 1 and means associated therewith for keeping the surface of the driven element in continuous contact with the driving element, said means consisting of a series of resilient teeth, placed over the surface of one of the elements.

7. The combination set forth in claim 1 and means associated therewith for keeping the surface of the driven element in continuous contact with the driving element, said means consisting of a series of resilient teeth placed over the surface of both elements.

8. The combination set forth in claim 1, the mechanical coupling between the driving element and driven element consisting of a flexible member placed in grooves which are cut along the working surfaces of both elements, said flexible member being anchored near the starting point of the driving element and near the finishing point of the driven element.

9. In combination, a driving shaft, a driven shaft, a driving element attached to the driving shaft, a driven element attached to the driven shaft, the surface of each element shaped to conform to the formulas expressed in claim 1, the constants in said formulas so chosen that for one complete revolution of the driving shaft the driven shaft makes one complete revolution, means for causing motion between driving and driven shafts and means for abruptly changing the speed ratios between the driving source and driven source at the end of each revolution of the driving element.

ERNEST A. MASSA, Jr.